(12) United States Patent
Zedell, Jr. et al.

(10) Patent No.: US 7,642,744 B2
(45) Date of Patent: Jan. 5, 2010

(54) CHARGER AND BATTERY COMBINATION WITH RETENTION ARMS AND MATING MEMBERS

(75) Inventors: Karl F. Zedell, Jr., Alpharetta, GA (US); Thinh T. Nguyen, Alpharetta, GA (US); Mark C. Taraboulos, Dunwoody, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 12/031,672

(22) Filed: Feb. 14, 2008

(65) Prior Publication Data

US 2008/0136370 A1 Jun. 12, 2008

Related U.S. Application Data

(63) Continuation of application No. 10/880,631, filed on Jun. 30, 2004, now abandoned.

(51) Int. Cl.
*H02J 7/00* (2006.01)
(52) U.S. Cl. .................. 320/107; 320/112; 320/114; 320/115
(58) Field of Classification Search .......... 320/107–116
See application file for complete search history.

(56) References Cited

U.S. PATENT DOCUMENTS

| 3,881,961 | A | 5/1975 | Nation |
| 4,691,157 | A | 9/1987 | Mc Dermott |
| 5,157,318 | A | 10/1992 | Wang |
| 5,851,692 | A | 12/1998 | Potts |
| 6,127,802 | A | 10/2000 | Lloyd et al. |
| 6,617,824 | B1 | 9/2003 | Zedell et al. |
| 2001/0017531 | A1* | 8/2001 | Sakakibara et al. ......... 320/106 |
| 2003/0025477 | A1* | 2/2003 | Yang ......................... 320/107 |

* cited by examiner

*Primary Examiner*—Patrick J Assouad
*Assistant Examiner*—Samuel Berhanu
(74) *Attorney, Agent, or Firm*—Philip H. Burrus, IV; Hisashi D. Watanabe; Anthony P. Curtis

(57) ABSTRACT

A charger and battery combination for recharging batteries has a pair of snap arms for retaining a battery within the pocket of the charger. When the battery is inserted into the charger pocket, the snap arms provide a downward force against the battery, thereby ensuring a sound electrical connection between the battery and electrical contacts disposed within the pocket. In one embodiment, the charger pocket includes a pair of channel apertures in which the snap arms are placed. Upon battery insertion, a flex member of the snap arm deflects, thereby allowing a mating feature of the battery to pass. When the battery is fully inserted, a coupling member of the snap arm exerts a force against the battery, thereby pushing the battery towards the bottom of the pocket.

13 Claims, 6 Drawing Sheets

CHARGER AND BATTERY COMBINATION WITH RETENTION ARMS AND MATING MEMBERS

RELATED APPLICATIONS

This is a continuation of U.S. application Ser. No. 10/880,631, filed Jun. 30, 2004.

BACKGROUND

1. Technical Field

The present invention relates to a charger for charging a rechargeable battery. More particularly, this invention relates to a battery charger having a pocket with a battery retention mechanism for securing a battery therein.

2. Background Art

Portable electronic devices are becoming more and more prevalent. Cellular phones, portable radios, pagers, personal organizers, and the like have become mainstays in everyday life. These and other similar devices rely on batteries for their portability. The cost of replacing "single use" batteries, like alkaline batteries for example, can be expensive. In an effort to save consumers money, electronics manufacturers are designing products which incorporate rechargeable batteries instead of single use cells. As rechargeable batteries can be charged and discharged hundreds of times before replacement is needed, the overall cost of operating a rechargeable device becomes much cheaper than using single use cells.

Two-way radios, like those used by police and fire departments, rely heavily upon rechargeable batteries. As lives may be at stake when the policeman or fireman is on the job, it is imperative that their radios have reliable batteries that are consistently ready to perform. For this reason, the battery for each radio is generally charged daily so as to be ready for the next shift.

Prior art chargers 100 for these radios, like that shown in FIG. 1, have included pockets 101 into which either the radio and battery, or the battery alone, may be inserted. Electrical contacts are included in the pocket 101 to charge the battery. The batteries must make a solid electrical connection with the contacts to charge efficiently. If the connection is not sound electrically, a good amount of the charging energy will be lost as heat, thereby unnecessarily extending the charging process. In the worst case, the batteries will not charge at all.

Traditional rechargeable batteries for radios have used nickel cadmium or nickel metal hydride cells, primarily due to their favorable cold weather performance and high discharge capability. Nickel based cells tend to be rather heavy. As such, when a nickel battery is inserted into the pocket of the charger, the sheer weight of the battery is generally sufficient to ensure a reliable electrical connection between the battery and the contacts in the pocket.

New advances in lithium based technologies, however, have made lithium ion and lithium polymer batteries suitable for radio applications. Lithium batteries are quite a bit lighter than are their nickel counterparts. Consequently, when a lithium battery is inserted into a charger pocket, it may not be heavy enough to ensure a proper electrical connection with the contacts. As a result, the charging process may be inefficient and unnecessarily extended.

There is thus a need for a new charger capable of ensuring a proper electrical connection between a lightweight battery and the electrical contacts.

DETAILED DESCRIPTION OF THE INVENTION

Figure 1:
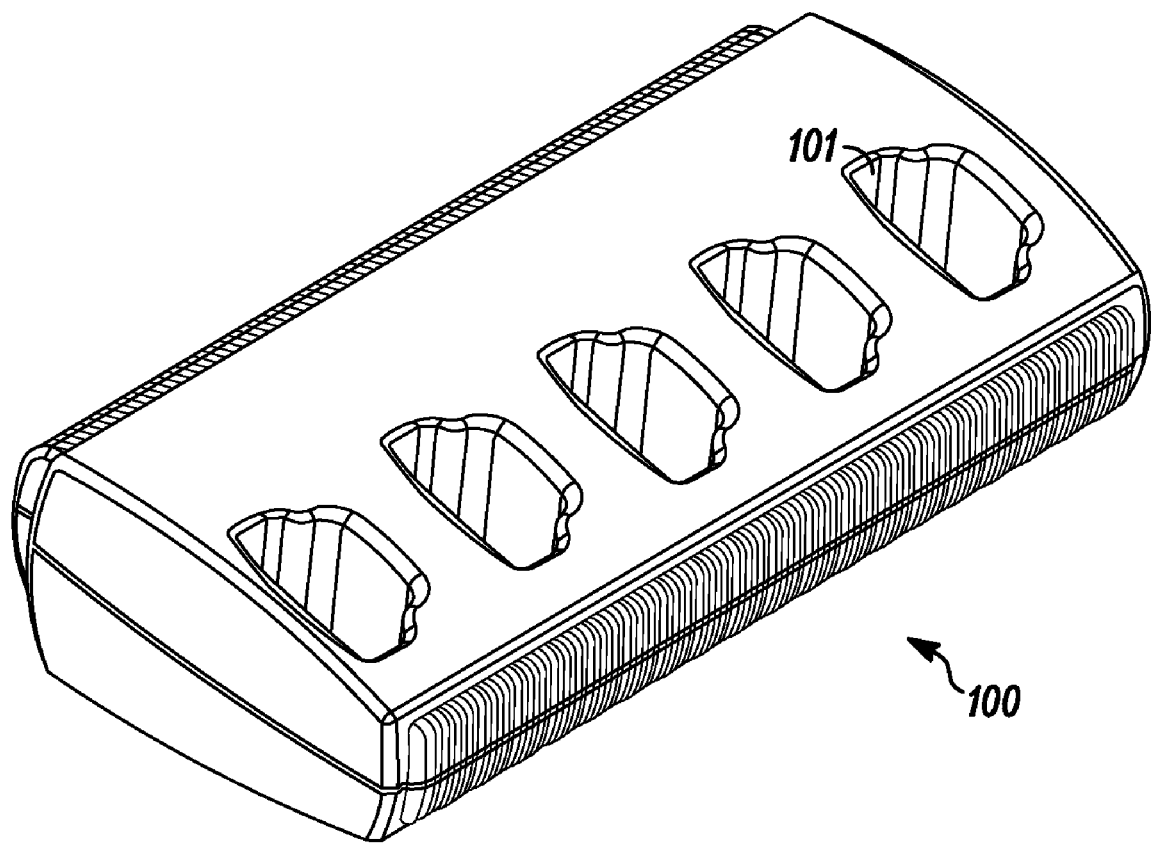
FIG. 1 illustrates a prior art charger.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

To solve the problems noted above with lightweight batteries, this invention includes a battery charger with at least one pocket capable of receiving a rechargeable battery. The pocket includes a pair of "snap arms" that extend downward from the top of the charger, in an angled fashion towards the bottom center of the pocket. When a rechargeable battery with features for mating to the snap arms is inserted into the pocket, the snap arms deflect, thereby allowing the mating features to slip past coupling members on the snap arms. Once the rechargeable battery is fully inserted, the snap arms exert a downward force against the battery, thereby facilitating a sound electrical connection between the battery and the electrical contacts disposed within the pocket.

Figure 2:
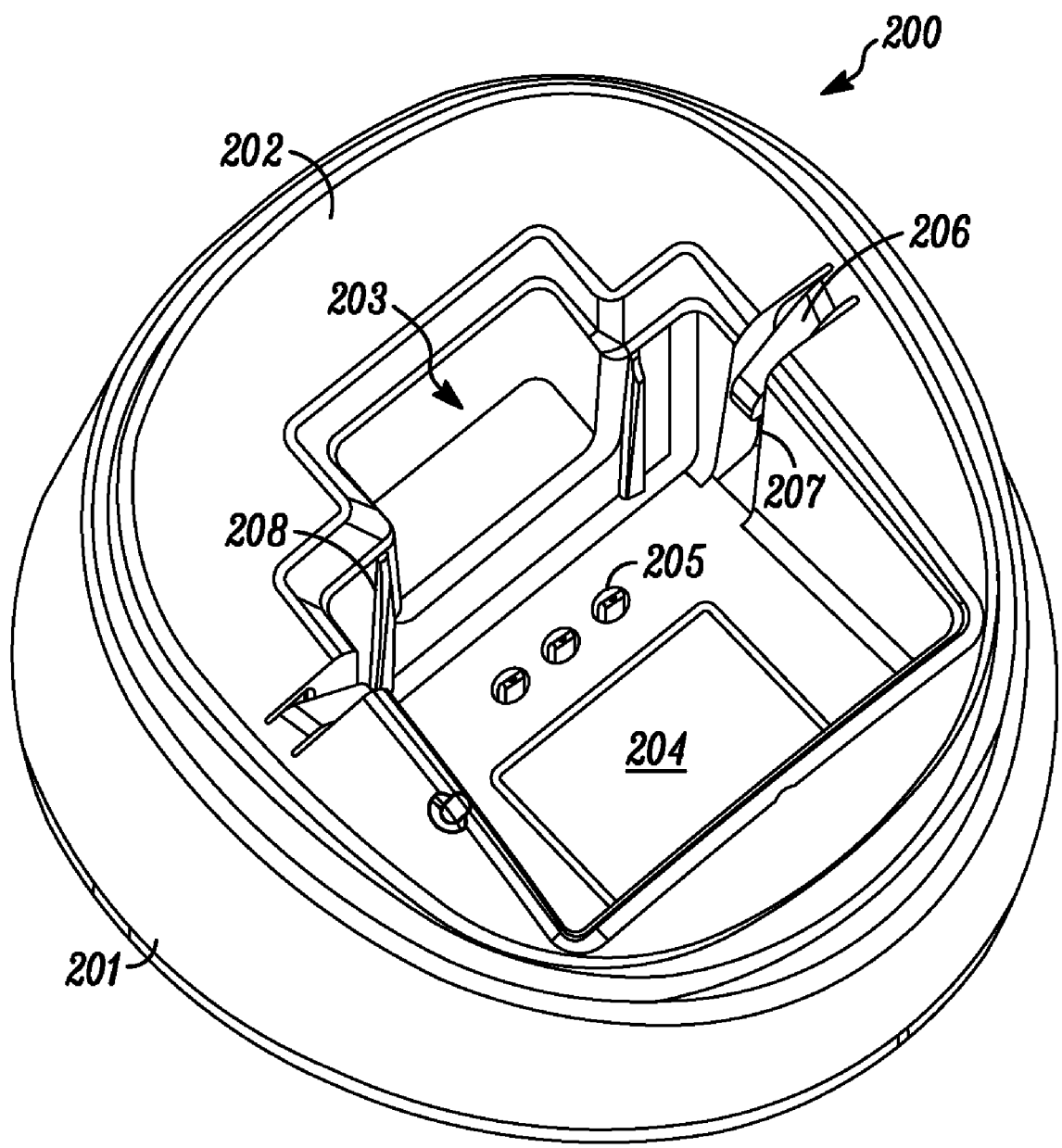
FIG. 2 illustrates a battery charger in accordance with the invention.

Turning now to FIG. 2, illustrated therein is one preferred embodiment of a battery charger 200 in accordance with the invention. The charger 200 includes a top housing 202, which is preferably manufactured from plastic by way of an injection molding process. The charger 200 includes at least one pocket 203 for accommodating a rechargeable battery. The pocket 203 may also be designed to receive an electronic device coupled to a battery. For example, the pocket 203 may be designed to mechanically couple to a two-way radio with a battery attached, so that the user need not detach the battery from the device prior to charging. Note that while the embodiment of FIG. 2 is a single unit charger having one pocket, multi-unit chargers may also be designed with multiple pockets simply by repeating the invention multiple times in a larger housing.

The pocket 203 includes a bottom member 204, or "bottom", which forms the base of the pocket 203. In this embodiment, electrically conductive contacts 205 are disposed within the pocket 203 on the bottom 204, although they could equally be positioned on the side walls of the pocket 203 as well.

The charger 200 includes a pair of non-conductive, cantilever arms 206 that are coupled to the top surface 202 of the charger 200. The non-conductive, cantilever arms 206 project downward from the top surface 202 of the charger 200 towards the pocket, particularly towards the bottom 204 of the pocket 203. The non-conductive, cantilever arms 206 extend downward from the top surface 202 at an angle of between thirty and seventy degrees, preferably between forty-five and fifty-five degrees. Experimental results have shown that one preferred angle that works particularly well is fifty degrees with respect to the top surface of the charger.

As will be shown in greater detail below, when a battery is inserted into the pocket, the non-conductive, cantilever arms 206 exert a force against the battery towards the bottom of the pocket. In so doing, the non-conductive, cantilever arms 206 serve as retention arms that tend to keep the battery "pushed" towards the bottom 204 of the pocket 203, and thus towards the electrical contacts 205, so as to ensure that the battery makes a sound electrical connection with the electrical contacts 205. Guide rails 208 may be included to better facilitate insertion of the battery into the pocket 203.

In this embodiment, the charger housing 202 also includes channel apertures 207. The term "channel" is used to describe these apertures 207 because they are long and thin, and run along the sides of the pocket 203. The non-conductive, cantilever arms 206 of this embodiment are disposed within the apertures 207 so as to allow the arms 206 to actuate as a cantilever beam when the rechargeable battery is inserted into the pocket 203. While the apertures 207 are not required, they offer advantages in that the non-conductive, cantilever arms 206 may be recessed so as to minimally interfere with the battery upon insertion.

Figure 3:
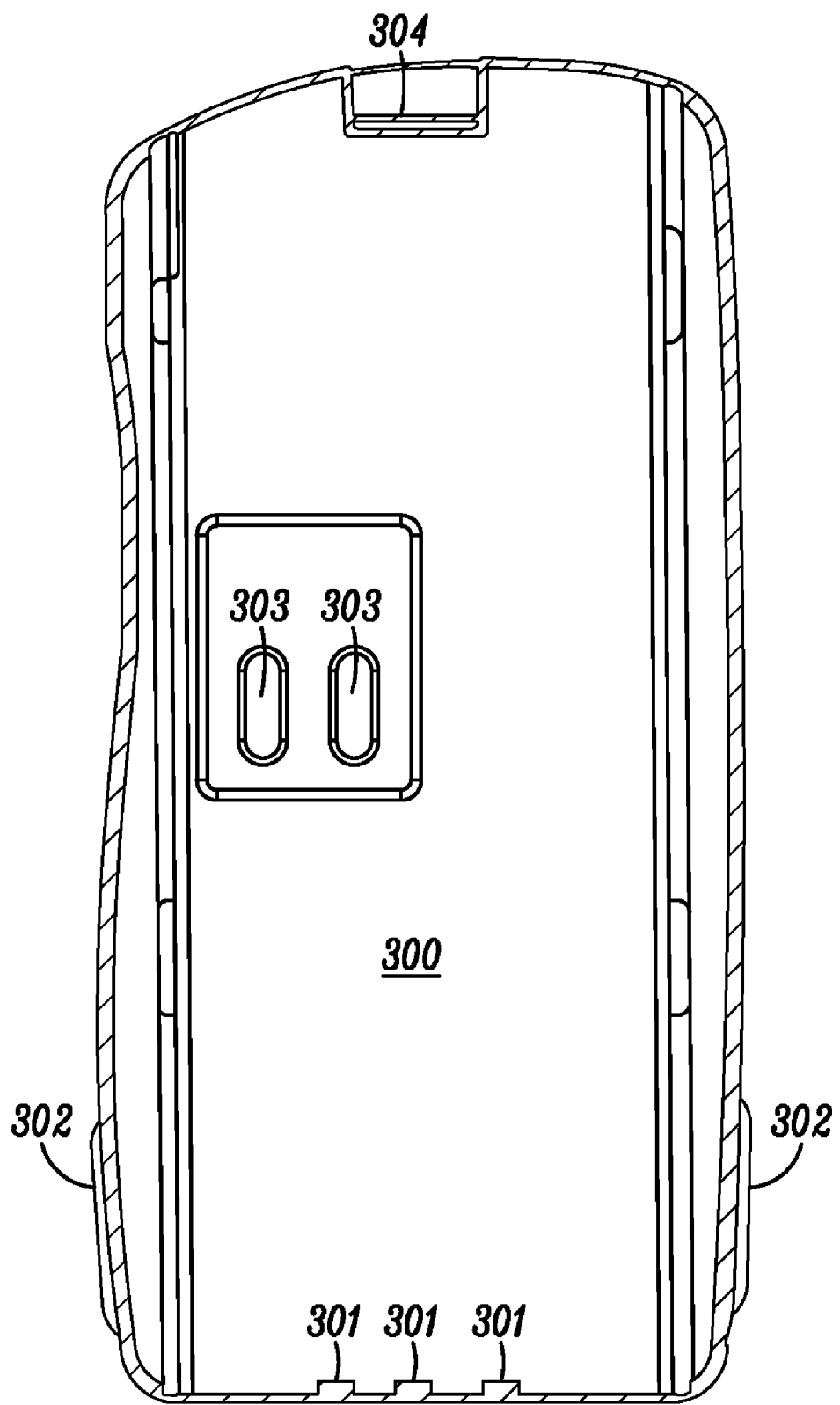
FIG. 3 illustrates one embodiment of a battery that may be used with the invention.

Turning now to FIG. 3, illustrated therein is one embodiment of a rechargeable battery 300 that may be used with a charger in accordance with the invention. The battery 300 may include mating features 302 for coupling with the non-conductive, cantilever arms 206 of FIG. 2. The apertures 207 of FIG. 2 are preferably large enough to accommodate the mating features 302 upon insertion.

The battery 300 may additionally include coupling features for coupling to an electronic device like a two-way radio. For example, electrical contacts 303 for coupling to the device and latching mechanisms 304 may be included. Additionally, a set of electrical contacts 301 for coupling to the electrical contacts (205 of FIG. 2) within the charger pocket are included.

Figure 4:
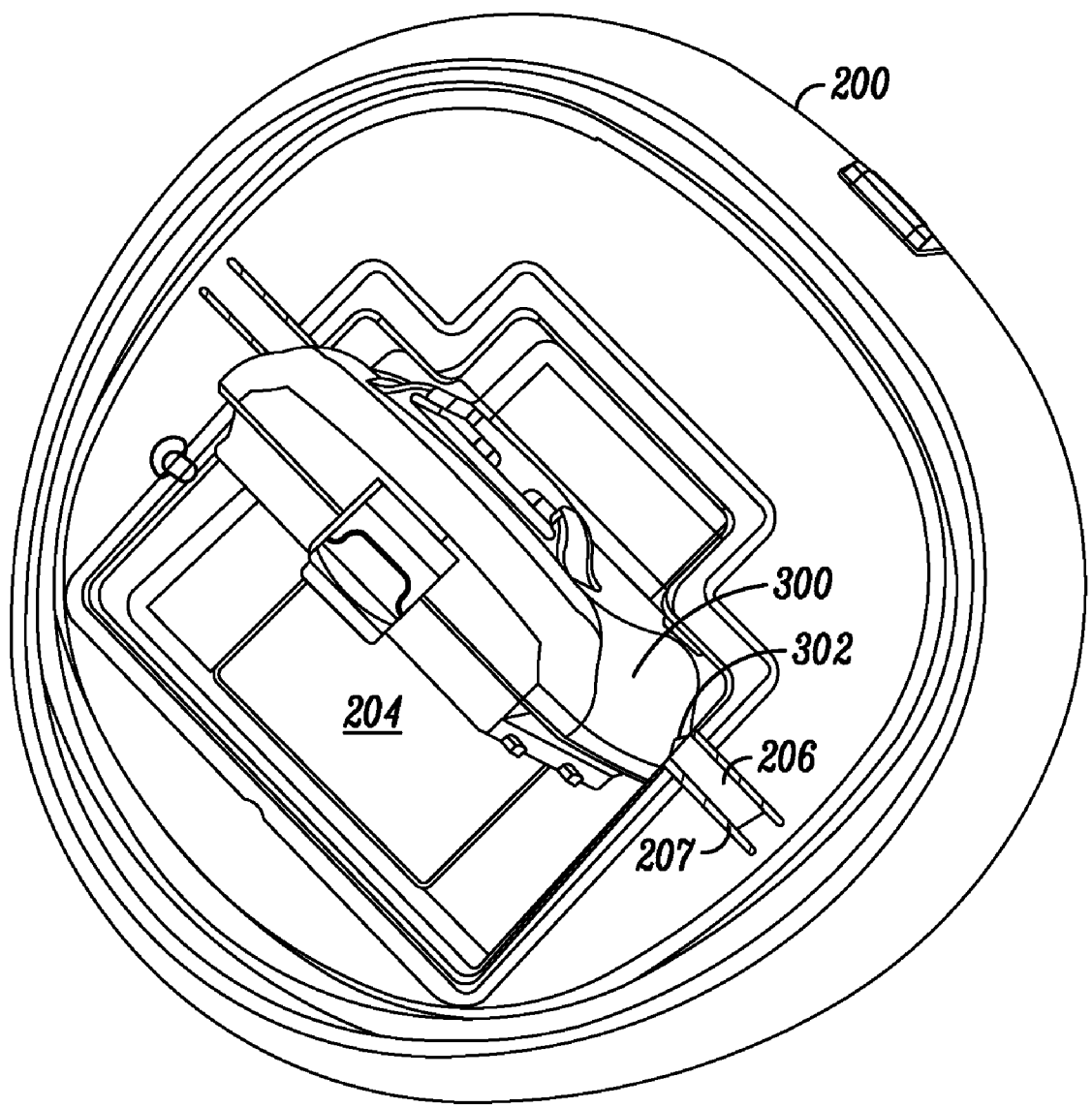
FIG. 4 illustrates a battery inserted into a charger in accordance with the invention.

Turning now to FIG. 4, illustrated therein is a rechargeable battery 300 that has been inserted into a charger 200 in accordance with the invention. When the battery is inserted, the non-conductive, cantilever arms 206 deflect so as to allow the mating members 302 to pass by. The mating members 302, extending outward from the battery 300, fit within the apertures 207 of the charger.

Once the battery 300 is inserted, the non-conductive, cantilever arms 206 "snap back" and exert a downward force upon the battery, thereby keeping the battery within the pocket and pressed slightly against the contacts 205. As such, even a lightweight battery like lithium-ion or lithium polymer will stay electrically connected to the contacts 205 within the pocket by way of the force exerted by the non-conductive, cantilever arms 206. This sound electrical connection allows electrical circuitry for recharging the battery disposed within the charger 200 to charge the battery 300 in an efficient and fast manner.

Figure 5:
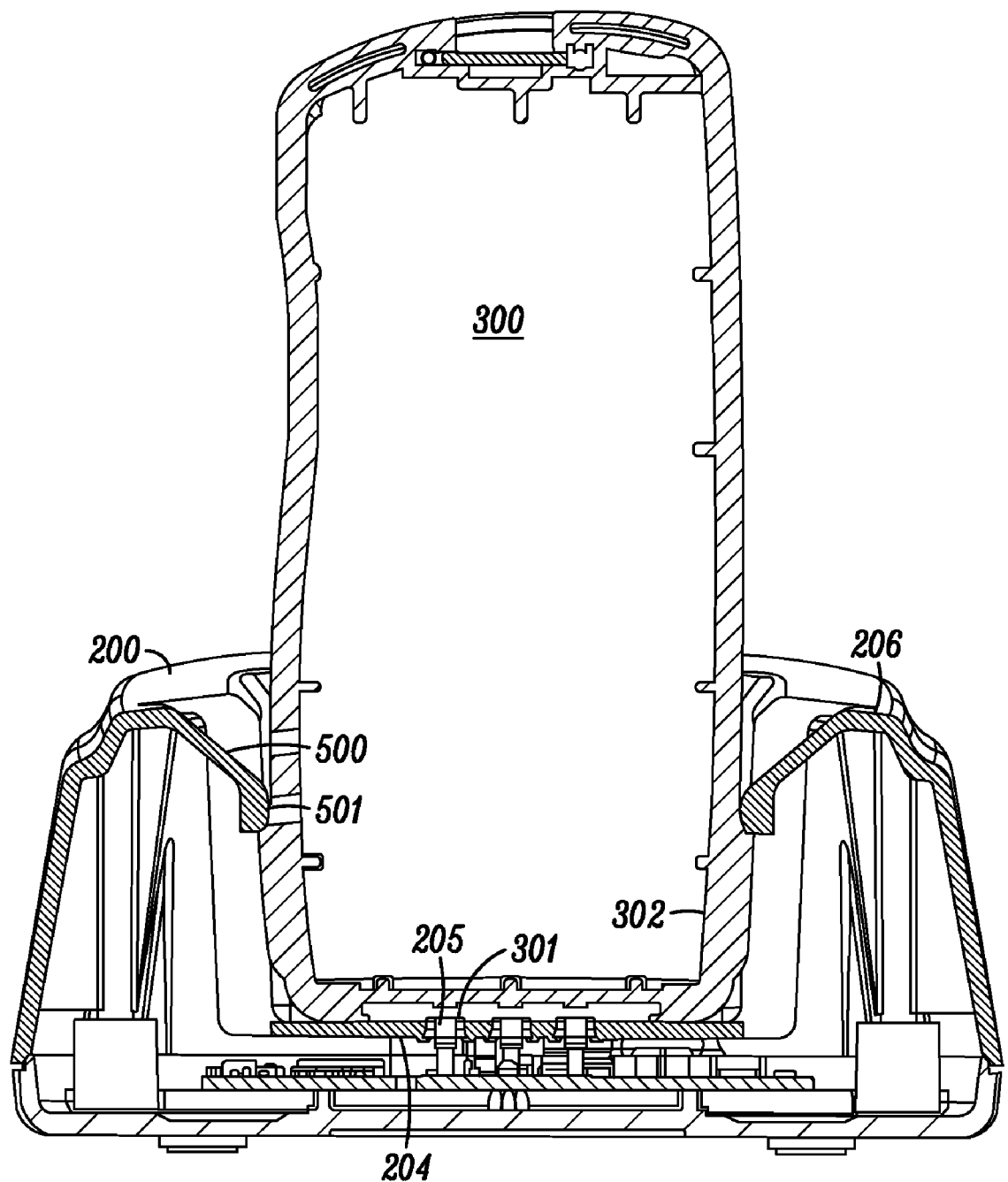
FIG. 5 illustrates a sectional view of a battery inserted into a charger in accordance with the invention.
Figure 6:
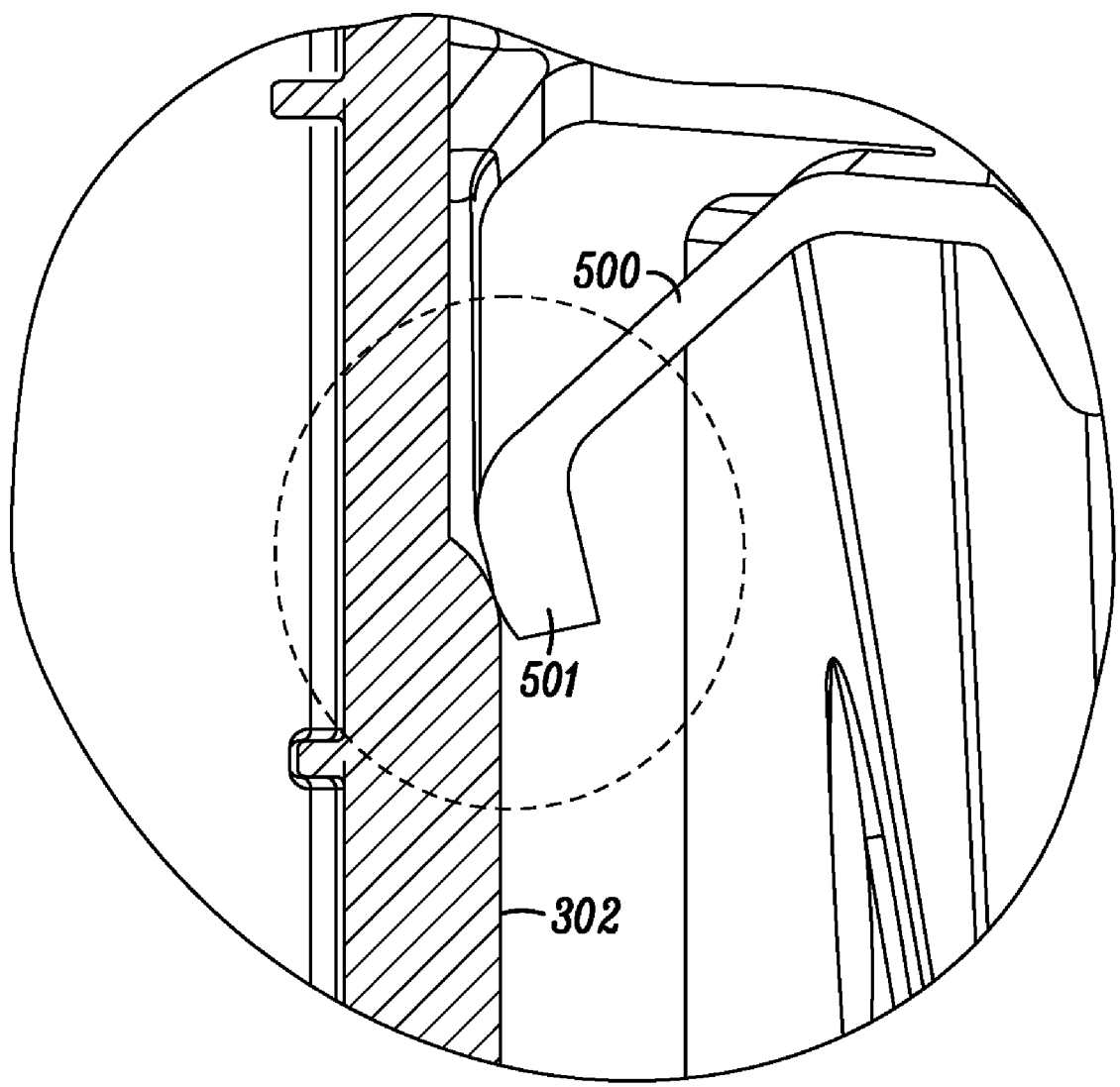
FIG. 6 illustrates an exploded view of a charger coupling to a battery in accordance with the invention.

Turning now to FIGS. 5 and 6, illustrated therein is a sectional view of a charger 200 in accordance with the invention having a battery 300 inserted therein, along with an exploded view of a cantilever arm connecting with the battery. From these views, the cantilever arms 206 may be more closely examined. Each cantilever arm 206 comprises a flex member 500 and a coupling member 501. The flex member 500 is the component that allows cantilever deflection of the arms 206 when the battery 300 is inserted. The coupling member 501, which extends from the flex member 500 at an angle of between 120 and 160 degrees, is a rounded feature that couples to the mating features 302 of the battery 300.

When the battery 300 is inserted, the flex members 500 deflect, thereby allowing the mating features 302 of the battery 300 to pass by the coupling members 501. Once the battery 300 is fully inserted, the flex members 500 "snap" back along the top of the mating features 302 of the battery 300. The coupling members 501 then exert a force causing the battery 300 to be retained within the pocket and even pressed slightly towards the bottom 204 of the pocket. As the flex member 500 is capable of bending slightly and then snapping back into position, the cantilever arms 206 are often called "snap arms".

When the battery 300 is held in place by the coupling members 501, a reliable electrical connection is maintained between the electrical contacts 205 of the charger and the electrical contacts 301 of the battery. The force applied by the cantilever arms 206 overcomes the force of the electrical contacts 205 in the charger 200 that may push upward against the battery 300.

The invention offers many advantages over prior art chargers. For example, without the cantilever arms of the present invention, the force of the electrical contacts it would be possible that all the electrical contacts in charger fail to engage the battery contacts simultaneously. Such a condition would prevent proper charging of the battery. The arms of this invention ensure proper charging upon each insertion.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a single unit charger has been described herein, by simply repeating the features of the invention multiple times in a large housing, a multi-unit charger could easily be manufactured.

What is claimed is:

1. A charger and battery combination having a charger capable of supporting a battery, the charger and battery combination comprising:
   first electrical contacts situated at an outer surface of the battery; and
   at least two mating members of the battery extending outward from the outer surface of the battery;
   at least one pocket of the charger capable of accommodating the battery, the at least one pocket including a bottom;
   second electrical contacts of the charger positioned within the at least one pocket; and
   at least two non-conductive arms situated in the at least one pocket, the at least two non-conductive arms capable of exerting a force toward the bottom of the at least one pocket against the at least two mating members of the battery and directed toward the bottom of the at least one pocket when the battery is supported by the at least one pocket, the at least two non-conductive arms formed from non-conductive material.

2. The charger and battery combination of claim 1, wherein:
   the first electrical contacts are situated at a side surface of the outer surface of the battery; and
   the at least two mating members of the battery extend outward from a bottom surface of the outer surface of the battery.

3. The charger and battery combination of claim 1, wherein:
the at least one pocket includes at least two apertures; and
the at least two mating members are capable of being situated in the at least two apertures of the at least one pocket when the battery is supported by the at least one pocket.

4. The charger and battery combination of claim 3, wherein the at least two non-conductive arms are disposed within the at least two apertures of the at least one pocket.

5. The charger and battery combination of claim 1, wherein the charger further comprises a top surface, wherein the at least two non-conductive arms project downward from the top surface at an angle between thirty and seventy degrees.

6. The charger and battery combination of claim 5, wherein the at least two non-conductive arms project downward from the top surface at an angle of between forty-five and fifty-five degrees.

7. The charger and battery combination of claim 1, wherein the at least two non-conductive arms each comprise a flex member and a coupling member.

8. The charger and battery combination of claim 7, wherein the coupling member projects from the flex member at an angle between 120 and 160 degrees.

9. The charger and battery combination of claim 1, wherein the second electrical contacts are disposed at the bottom of the at least one pocket.

10. The charger and battery combination of claim 1, wherein the charger further comprises electrical circuitry for recharging the battery.

11. The charger and battery combination of claim 1, wherein the pocket further comprises guide rails disposed on at least one side of the at least one pocket.

12. The charger and battery combination of claim 7, wherein the coupling member is a rounded feature that has a thickness larger than the thickness of the flex member.

13. The charger and battery combination of claim 4, wherein the at least two mating members are formed from a non-conductive material, the at least two non-conductive arms each comprise a flex member and a coupling member, the coupling member capable of contacting the at least two mating members in the at least two apertures of the at least one pocket when the battery is supported by the at least one pocket.

* * * * *